United States Patent
Ross et al.

(10) Patent No.: US 10,822,755 B1
(45) Date of Patent: Nov. 3, 2020

(54) GROUND SURFACE MARKER AND METHOD FOR SURFACE MARKING

(71) Applicants: Graham Allan Ross, Auckland (NZ); Jason Lynch, Auckland (NZ)

(72) Inventors: Graham Allan Ross, Auckland (NZ); Jason Lynch, Auckland (NZ)

( * ) Notice: Subject to any disclaimer, the term of this patent is extended or adjusted under 35 U.S.C. 154(b) by 0 days.

(21) Appl. No.: 16/664,343

(22) Filed: Oct. 25, 2019

(51) Int. Cl.
| | |
|---|---|
| *E01F 9/518* | (2016.01) |
| *E01F 9/588* | (2016.01) |
| *E01C 23/14* | (2006.01) |
| *E01C 23/16* | (2006.01) |
| *E01C 23/22* | (2006.01) |
| *C09D 7/61* | (2018.01) |
| *C09D 7/40* | (2018.01) |
| *C09D 5/33* | (2006.01) |

(52) U.S. Cl.
CPC ............ *E01F 9/518* (2016.02); *C09D 5/004* (2013.01); *C09D 7/61* (2018.01); *C09D 7/70* (2018.01); *E01C 23/14* (2013.01); *E01C 23/16* (2013.01); *E01C 23/163* (2013.01); *E01C 23/22* (2013.01); *E01F 9/588* (2016.02)

(58) Field of Classification Search
CPC ........ E01F 9/518; E01F 9/588; E01C 23/163; E01C 23/22; E01C 23/14; E01C 23/16; C09D 7/70; C09D 5/004; C09D 7/61
See application file for complete search history.

(56) References Cited

U.S. PATENT DOCUMENTS

| | | | | |
|---|---|---|---|---|
| 3,337,483 A | * | 8/1967 | Searight | C09D 167/00 523/172 |
| 4,255,468 A | * | 3/1981 | Olson | C08G 59/18 427/137 |
| 5,516,227 A | * | 5/1996 | Kozak | C09D 5/004 106/436 |
| 5,665,793 A | * | 9/1997 | Anders | C09D 5/004 252/301.36 |
| 5,874,491 A | * | 2/1999 | Anders | C09D 5/004 252/301.36 |
| 6,211,260 B1 | * | 4/2001 | Nakamura | C09D 4/00 522/100 |
| 9,163,152 B2 | * | 10/2015 | Karunaratne | C09D 7/70 |
| 2012/0092767 A1 | * | 4/2012 | Naik | E01F 9/524 359/547 |
| 2014/0050907 A1 | * | 2/2014 | Clamen | C09D 5/004 428/215 |
| 2017/0218582 A1 | * | 8/2017 | Boise | B05D 1/00 |

* cited by examiner

*Primary Examiner* — William P Fletcher, III
(74) *Attorney, Agent, or Firm* — Ward Law Office LLC; Jacob M. Ward

(57) ABSTRACT

The invention relates to a ground surface marker and method for surface marking. It is known to apply surface markings, for example road markings, using paint. Many current road marking paints have a touch dry time from about five minutes to one hour, with full drying taking 24 hours or more, depending on the air temperature. The dry time of current paints can delay the opening of a road which may be costly because it increases the need for traffic control and can expose contractors to motoring hazards. If roads are opened prior to full drying of the paint, then the road markings may be compromised by contact with vehicle wheels. The invention aims to go at least some way toward addressing these problems by providing a ground surface marker comprising a paint applicator, a dispenser associated with reflectors, and a UV light source.

10 Claims, 5 Drawing Sheets

GROUND SURFACE MARKER AND METHOD FOR SURFACE MARKING

FIELD

This invention relates to a ground surface marker and method for surface marking. A preferred form of the invention relates to a surface marker that uses paint embedded with glass beads where the paint is dried using UV light.

BACKGROUND

It is known to apply surface markings, for example road markings, using paint. Many current road marking paints have a touch dry time from about five minutes to one hour, with full drying taking 24 hours or more, depending on the air temperature. The dry time of current paints can delay the opening of a road which may be costly because it increases the need for traffic control, and can expose contractors to motoring hazards. If roads are opened prior to full drying of the paint then the road markings may be compromised by contact with vehicle wheels.

OBJECT

It is an object of a preferred embodiment of the invention to go at least some way towards addressing at least some of these problems. While this applies to the preferred embodiment, it should be understood that the object of the invention per se is simply to provide a useful choice. Therefore any objects or advantages applicable to any preferred embodiment should not be seen as a limitation on the scope of claims expressed more broadly.

INTERPRETATION

The term "comprises", or derivatives thereof, should not be interpreted as excluding other features. For example, if used in relation to a combination of features it indicates that optionally, but not necessarily, there may be additional features that have not been mentioned.

SUMMARY

In a first aspect of the invention there is provided a ground surface marker, comprising: a paint applicator; a dispenser adapted to dispense reflectors; and an LED UV light source; characterized in that the marker can move or be moved across a ground surface so that as it moves: the applicator applies resin paint to the surface; the dispenser causes the reflectors to contact the paint so that at least some are partially embedded in the paint and some are fully embedded in the paint, at least some of the partially embedded reflectors contacting some of the fully embedded reflectors; the LED light source applies UV light to the paint and reflectors so that the UV light refracts through the reflectors and into the paint to dry the paint so that the reflectors are fixed in the paint and are able to reflect visible light.

Optionally the reflectors are of a type that allow at least a substantial portion of the UV light to pass through them to facilitate drying of the paint from within the paint (e.g. drying from below the upper surface of the paint).

Optionally the UV light has a wavelength in the range of about 365 to 430 nanometres.

Optionally the UV light has a wavelength in the range of about 345 to 410 nanometres.

Optionally the UV light has a wavelength of about 405 nanometres.

Optionally the UV light source incorporates a housing and a fringe of bristles, the bristles arranged to keep light from the UV light source substantially within the fringe.

Optionally the surface marker comprises a pair of paint guides (e.g. chains or other threads), each guide extending vertically so that there is a space between them, the guides being aligned with the applicator to guide straight line application of paint on a ground surface.

Optionally the reflectors comprise glass beads.

Optionally the reflectors comprise quartz beads.

Optionally the beads are generally spherical with an average diameter of from about 100 microns to about 850 microns in diameter.

Optionally the beads are generally spherical with an average diameter of about 850 microns to about 1400 microns in diameter.

Optionally the paint applicator is arranged to spray the paint.

Optionally the marker is loaded with paint and is suitable for applying that paint to a ground surface to have film thickness of about 175 to about 350 microns when dry.

Optionally the marker is loaded with paint and is suitable for applying that paint to a ground surface to have film thickness of about 175 to about 300 microns when dry.

Optionally the marker is loaded with paint and is suitable for applying that paint to a ground surface to have film thickness of about 175 to about 250 microns when dry.

Optionally the ground surface marker comprises: a motorised wheeled vehicle; a paint sprayer connected by a hose to a paint tank; the UV light source comprising a housing and a fringe of bristles; and a pair of paint guides, each guide extending vertically so that there is a space between them, the guides being aligned with the applicator; characterized in that the marker can move or be moved across a ground surface by a human operator so that as it moves: the sprayer sprays paint from the tank to the surface in a line at least partially between the guides; the dispenser causes the reflectors to move to contact the paint; and the UV light source applies UV light to the paint and reflectors to dry the paint so that the reflectors are fixed in the paint and able to reflect visible light, the bristles keeping light from the UV light source substantially within the fringe.

According to a further aspect of the invention there is provided a method of marking a ground surface comprising the steps of: moving along the surface a ground surface marker comprising a paint applicator, a dispenser associated with reflectors and a UV light source; applying paint to the surface; causing reflectors to sit in the paint on the surface; and applying UV light to the paint and reflectors such that the light causes the paint to dry such that the reflectors are fixed in the paint and able to reflect visible light.

Optionally the reflectors are allowing at least a substantial portion of the UV light to pass through them to facilitate drying of the paint from within the paint beneath the upper surface of the paint.

Optionally the UV light has a frequency in the range of about 365 to 430 nanometres.

Optionally the UV light has a frequency in the range of about 345 to 410 nanometres.

Optionally the UV light has a frequency of about 405 nanometres.

Optionally the UV light source incorporates a housing and a fringe of bristles, the bristles serving to keep light from the UV light source substantially within the fringe.

Optionally the surface marker comprises a pair of paint guides (e.g. chains or other threads), each guide extending vertically so that there is a space between them, the guides being aligned with the applicator and used to guide straight-line application of the paint on the ground surface.

Optionally the reflectors comprise glass beads.

Optionally the reflectors comprise quartz beads.

Optionally the beads are spherical and have an average diameter from about 100 microns to about 850 microns in diameter.

Optionally the beads are spherical and have an average diameter from about 850 microns to about 1400 microns in diameter.

Optionally the paint applicator sprays the paint on the surface.

Optionally the marker applies the paint to the ground surface to have film thickness of about 175 to about 300 microns when dry.

Optionally the marker applies the paint to the ground surface to have film thickness of about 175 to about 250 microns when dry.

Optionally the marker applies the paint to the ground surface to have film thickness of about 175 to about 200 microns when dry.

BRIEF DESCRIPTION OF DRAWINGS

Some preferred embodiments of the invention will now be described by way of example and with reference to the accompanying drawings and images, of which.

DETAILED DESCRIPTION

Figure 1:
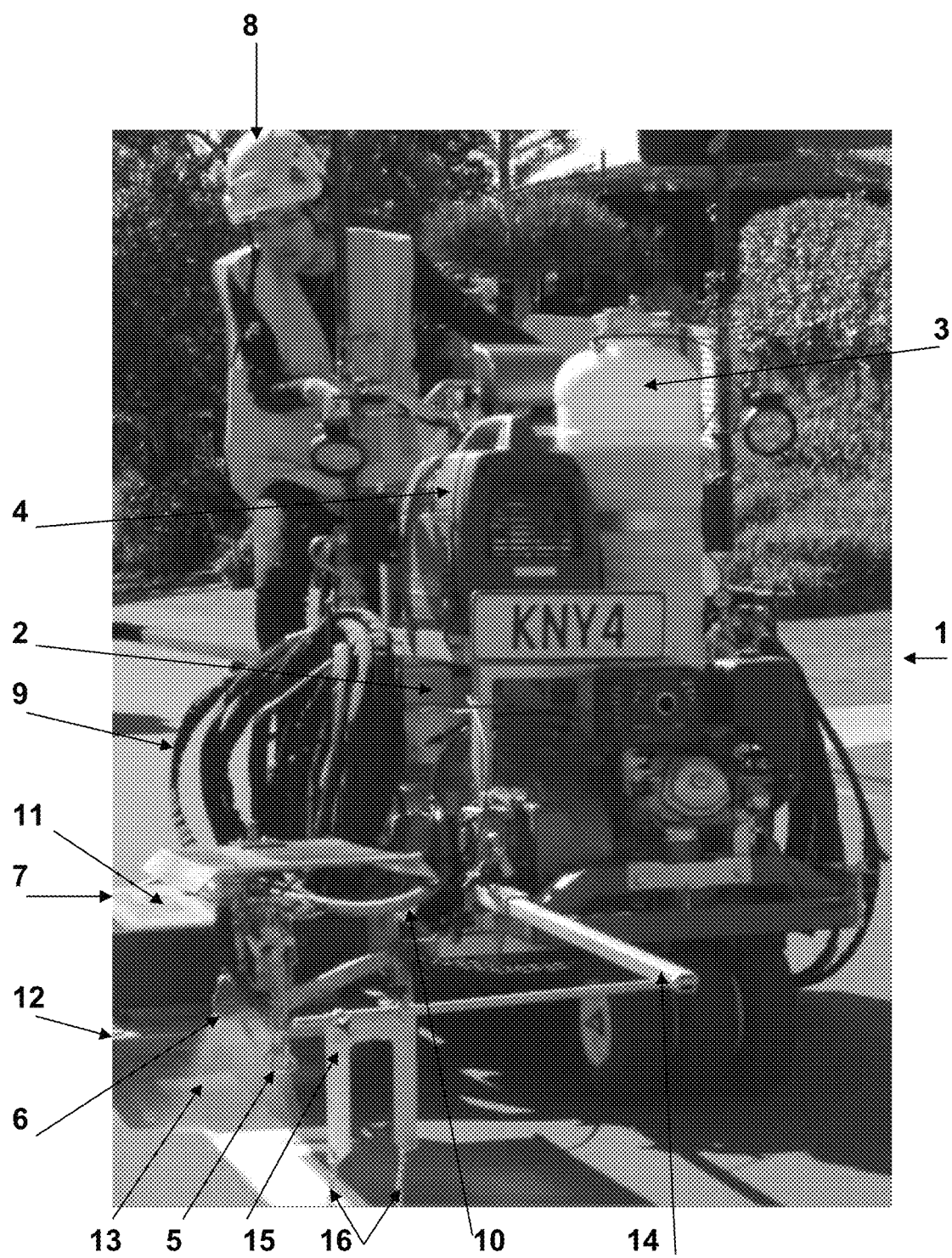
FIG. 1 is a front perspective view of a ground surface marker.
Figure 2:
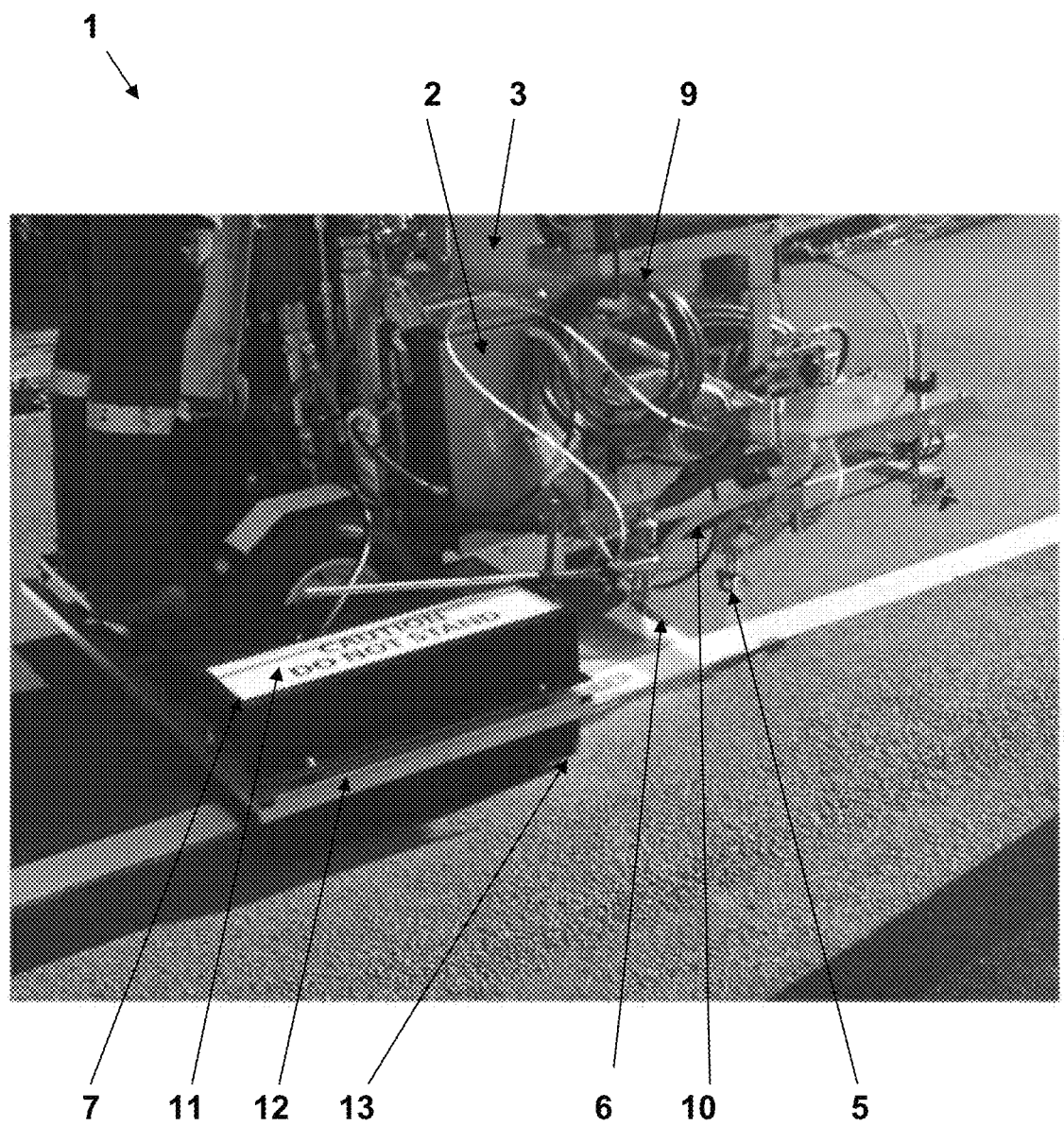
FIG. 2 is a rear side perspective view of part of the marker.

Referring to FIGS. 1-4 a ground surface marker 1 comprises a paint tank 2, a bead container 3, a pump (not shown), a generator 4, a paint applicator, for example a spray gun 5, a bead dispenser 6, and a UV light module 7. The marker 1 is typically used to apply paint to a road to either create new road markings or to repaint existing road markings that are fading. The marker 1 may also be used for surfaces in off-road situations, for example for applying markings in carparks, schools, shopping centres, factories, and warehouses.

In the preferred embodiment shown in FIG. 1 the marker 1 comprises a three or four-wheeled motorised cart driven by a human operator 8. However, in alternative embodiments the marker 1 may comprise a larger vehicle, for example a truck, which may accommodate multiple operators. In still further embodiments the marker 1 may be towed and without its own motive force or may be automated.

A paint hose 9 connects the paint tank 2 to the spray gun 5. The hose 9 is preferably high pressure, polytetrafluoroethylene ("PTFE")/Teflon™-lined, and light-shielded. The pump is a low shear, high pressure pump capable of delivering paint from the tank 2 to the spray gun 5 within a range of 1-3000 pounds per square inch ("PSI"). The spray gun 5 is preferably an automatic, airless spray gun with PTFE/Teflon™ low sheer seals. However other types of spray gun are also suitable, for example an air-pressurised spray gun. The pump is able to deliver paint from the tank 2 to and from the spray gun 5.

A bead hose 10 connects the bead container 3 to the dispenser 6. The container 3 is filled with reflectors in the form of beads. The beads may be conventional glass beads. In an alternative embodiment of the invention the beads may be quartz beads. Beads will be substantially round and sized in the range of about 100 to 1400 microns in diameter. In the preferred embodiment the beads will be in the range of about 600 to 850 microns (called Type B beads), and in the range of about 1100 to 1400 microns in diameter (called Type D beads).

The beads can be fed to the dispenser 6 by a pressure feeder (not shown). Alternatively, the beads can be moved to the dispenser 6 under gravity.

The UV light module 7 comprises a housing 11 which contains an LED UV light which is powered by the generator 4. Alternatively a non-LED UV light may be used. The module 7 is attached to a metal frame 12 which forms part of the marker 1. The lower part of the housing 11 is open and surrounded by a fringe of coarse bristles 13 which assists in protecting the eyesight of people in the vicinity of the marker 1 by substantially blocking UV light from view. The bristles 13 are similar to those used in commercial and automotive dust, spray and light barriers.

Figure 3:
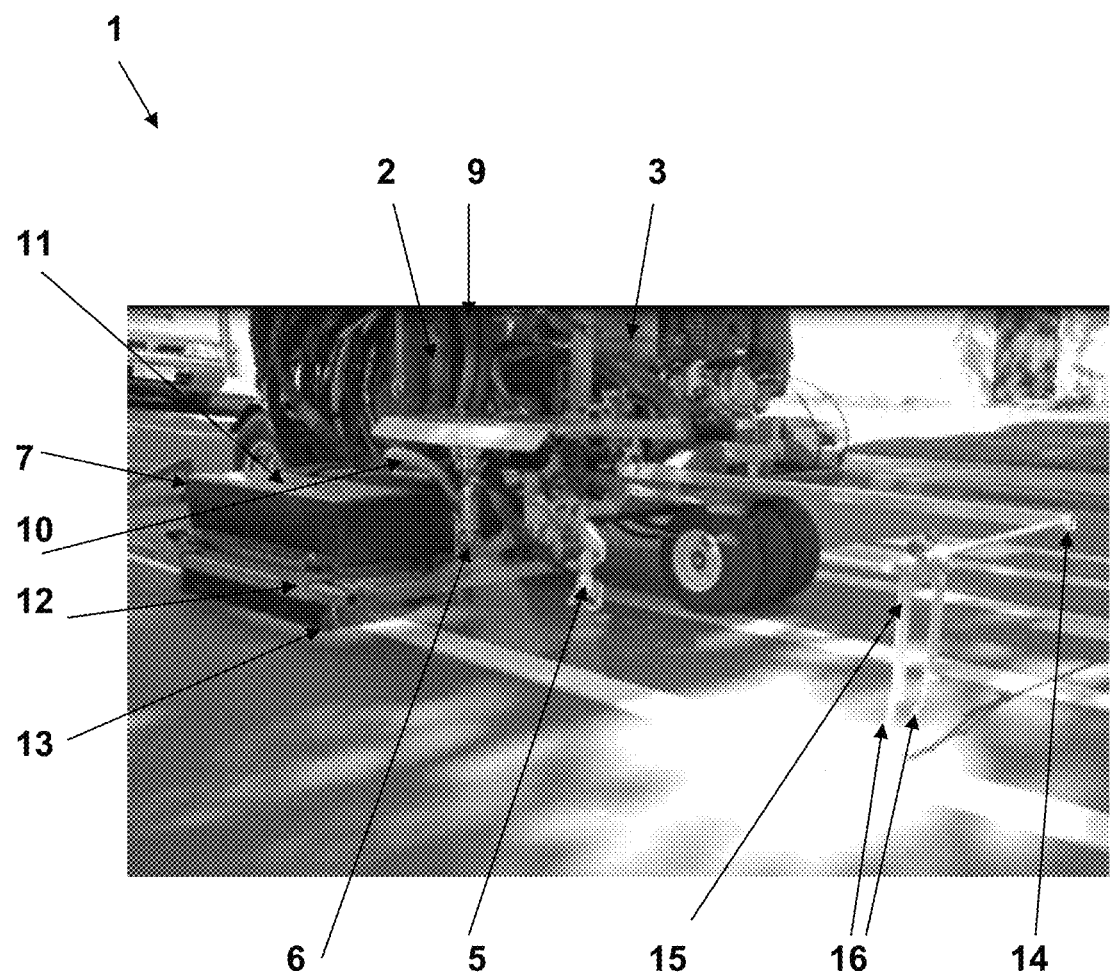
FIG. 3 is a front side perspective view of part of the marker.
Figure 4:
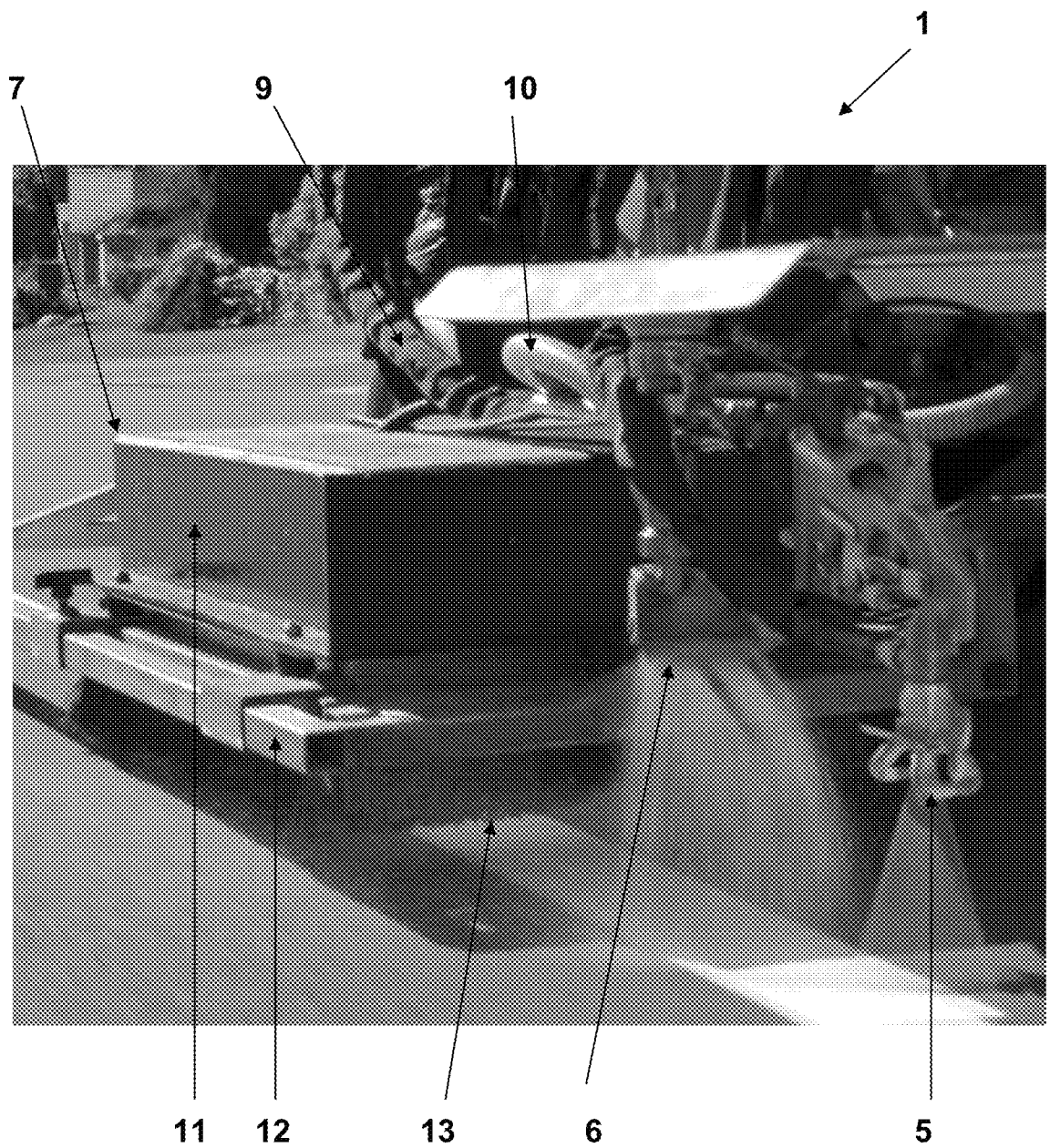
FIG. 4 is a further perspective view of part of the marker.

As can be seen in FIGS. 1 and 3, the marker 1 may also have a substantially L-shaped pole 14 that extends from the front of the marker 1. Fixed to the end of the pole is a pair of pair of guiding arms 15 from which chains 16 hang, to assist the operator to apply road markings in the correct position. To do this, the operator 8 aligns the marker 1 so that the chains 16 hang over either side of worn pre-existing markings as a visual cue for the operator 8. The spray gun 5 is arranged to deliver paint accurately when the chains 16 hang either side of pre-existing markings. If new markings are being painted, then the operator 8 aligns the marker 1 so that the guide chains 16 hang over either side of a guide line indicating where new road markings should be painted.

In use, the container 3 is filled with beads and the tank 2 is filled with suitable paint. In the preferred embodiment filled, thick film resin road marking paint is used. The road marking paint comprises synthetic resin, pigments, and packing materials/particles. Other types of paint may also be suitable for use in the invention, for example water-based paints, latex paints and acetone paints. White pigments in these paints may comprise titanium dioxide, zinc oxide, and lithophone. Yellow pigments in these paints may comprise heat-resistant yellow lead.

In the preferred embodiment, to apply or to reapply road markings the marker 1 is driven by the operator to the correct position on the road. The operator determines the correct position by aligning the marker 1 and the chains 16 to hang as visual cues, as described above.

The operator drives forward and activates the pump, spray gun 5, bead dispenser 6 and the generator 4 to power the UV light module 7. The pump feeds paint to the spray gun 5. As can be seen in FIGS. 1-4, the spray gun 5 applies paint to the road. In the preferred embodiment the paint is applied as a medium film build of about 175-300 micron dry film thickness ("DFT"). Alternatively the film build can be in the range of about 175-250 micron DFT or about 175-200 micron DFT. However, the paint may also be applied as a high film build of up to about 350 micron DFT. The DFT may be adjusted by the size of the spray tip and by the speed that the paint is applied. Type D beads are preferred for use with paint applied as a medium film build. Type B beads, or Type B beads mixed with Type D beads, are preferred for use with paint applied as a high film thickness.

At the same time beads are fed to the dispenser 6, which is positioned behind the spray gun 5, and the beads are sprayed onto the road and are fully or partially embedded into wet paint as the marker 1 moves forward. The UV light module 7, powered by the generator 4, then passes over the bead-embedded paint and causes drying of the paint with embedded beads normally within about 0.5 to 1.5 seconds.

In an alternative embodiment of the invention, there are two bead containers feeding beads of alternative sizes to two corresponding bead dispensers. The two bead dispensers are mounted one behind the other, dispensing larger beads (for example, Type D beads) first followed by smaller beads (for example, Type B beads) after which the UV light causes drying of the paint with embedded beads of different sizes.

Figure 5:
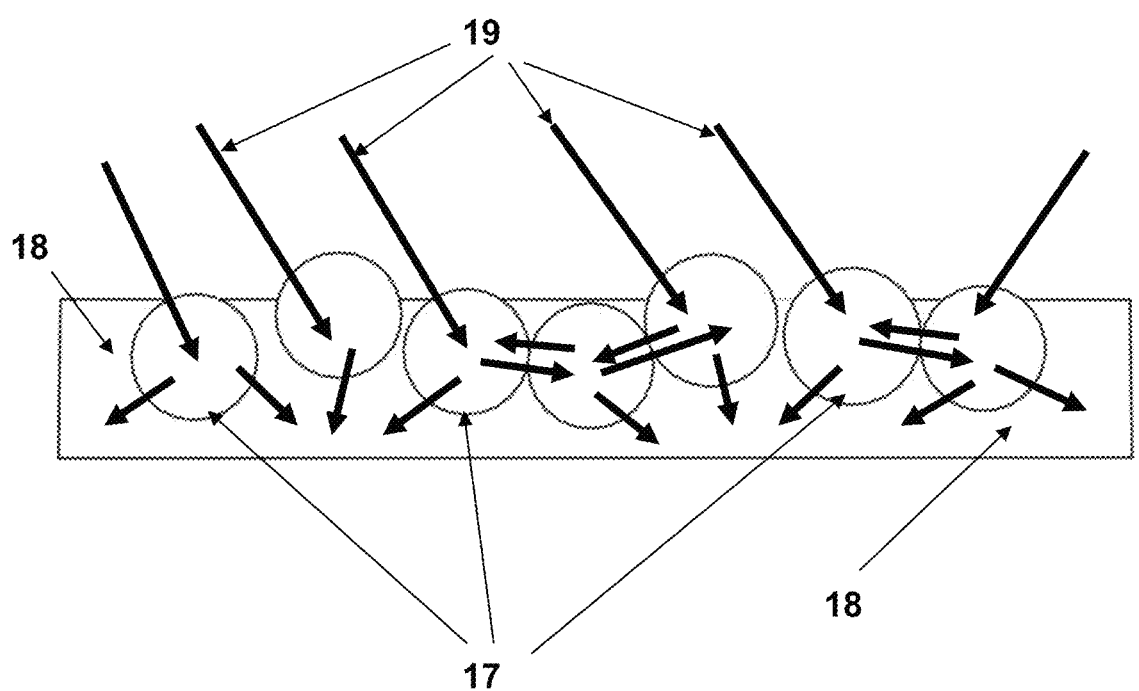
FIG. 5 is a diagrammatic view of UV light passing through beads in paint.

More specifically and referring to FIG. 5, the majority of the beads 17 are partially embedded in the paint 18 while some of the beads are fully embedded. The fully embedded beads will typically be contacting or adjacent the partially embedded beads. UV light waves 19 pass through the partially embedded beads because they protrude from the paint and so are exposed to the UV light. UV light waves will also pass through embedded beads that are contacting the partially embedded beads. The UV light refracts through the beads and into the paint to dry it. The spherical shape of the beads assists in the refraction of the UV light. This drying is facilitated by the wavelength of the UV light. In the preferred embodiment of the invention the wavelength of the UV light is about 405 nanometres ("nm"). However, ranges of about 365 to 430 nm and of about 345 to 410 nm are also effective. The process above using UV light causes the paint to dry through the film within about 0.5 to 1.5 seconds rather than only from the top down which is what happens when paint dries in sunlight.

Using the marker 1 to dry paint means that the area painted does not need to be closed off to allow for drying for as long as with many conventional road marking methods. The operator may also reverse over lines already painted almost immediately without smudging the paint so that multiple lines that need to be painted or repainted in a small area can be done without having to wait long periods for paint to dry.

While some preferred embodiments of the invention have been described by way of example it should be appreciated that modifications and improvements can occur without departing from the scope of the following claims.

What is claimed is:

1. A method of marking a ground surface comprising the steps of:
    providing a ground surface marker, including:
        a paint applicator;
        a dispenser adapted to dispense reflectors; and
        an LED UV light source;
        characterized in that the marker can move or be moved across a ground surface so that as it moves:
            the applicator applies resin paint to the surface;
            the dispenser causes the reflectors to contact the paint so that at least some are partially embedded in the paint and some are fully embedded in the paint, at least some of the partially embedded reflectors contacting some of the fully embedded reflectors; and
        the LED light source applies UV light to the paint and reflectors so that the UV light refracts through the reflectors and into the paint to dry the paint so that the reflectors are fixed in the paint and are able to reflect visible light;
    moving the ground surface marker along the surface;
    applying the paint to the surface;
    causing the reflectors to contact the paint so that at least some of the reflectors are partially embedded in the paint and some of the reflectors are fully embedded in the paint, at least some of the partially embedded reflectors contacting some of the fully embedded reflectors; and
    applying UV light from the LED light source to the paint and the reflectors such that the light causes the paint to dry such that the reflectors are fixed in the paint and are able to reflect visible light.

2. The method of marking the ground surface according to claim 1, wherein the reflectors allow at least a substantial portion of the UV light to pass through them to facilitate drying of the paint from within the paint beneath the upper surface of the paint.

3. The method of marking the ground surface according to claim 1, wherein the UV light has a wavelength in the range of about 365 to 430 nanometers.

4. The method of marking the ground surface according to claim 1, wherein the UV light has a wavelength in the range of about 345 nanometers to 410 nanometers.

5. The method of marking the ground surface according to claim 1, wherein the UV light has a wavelength of about 405 nanometers.

6. The method of marking the ground surface according to claim 1, wherein the UV light source incorporates a housing and a fringe of bristles, the bristles serving to keep light from the UV light source substantially within the fringe.

7. The method of marking the ground surface according to claim 1, wherein the surface marker comprises a pair of paint guides, each guide extending vertically so that there is a space between them, the guides being aligned with the applicator and used to guide straight-line application of the paint on the ground surface.

8. The method of marking the ground surface according to claim 1, wherein the reflectors comprise glass or quartz beads.

9. The method of marking the ground surface according to claim 1, wherein the reflectors are spherical and have an average diameter from about 100 microns to about 850 microns.

10. The method of marking the ground surface according claim 1, wherein the marker applies the paint to the ground surface to have film thickness of about 175 to about 350 microns when dry.

* * * * *